United States Patent [19]

Kimball et al.

[11] Patent Number: 4,596,836

[45] Date of Patent: Jun. 24, 1986

[54] STABILIZING URETHANES WITH ANTIOXIDANTS

[75] Inventors: Michael E. Kimball, West Brook, Me.; Richard E. Fruzzetti, Wadsworth, Ohio

[73] Assignee: The Goodyear Tire & Rubber Company, Akron, Ohio

[21] Appl. No.: 691,317

[22] Filed: Jan. 14, 1985

[51] Int. Cl.$^4$ ............................................. C08G 18/14
[52] U.S. Cl. ................................. 521/114; 521/116; 521/117; 521/121; 521/176; 521/177; 524/738; 524/742; 524/750
[58] Field of Search ............... 521/114, 116, 117, 121, 521/176, 177; 524/738, 742, 750

[56] References Cited

U.S. PATENT DOCUMENTS

| | | | |
|---|---|---|---|
| 3,155,625 | 11/1964 | Long et al. | 252/182 |
| 3,331,792 | 7/1967 | O'Shea | 521/177 |
| 3,933,692 | 1/1976 | Kushlefsky et al. | 521/121 |
| 4,225,453 | 9/1980 | DePaul et al. | 521/121 |
| 4,374,970 | 2/1983 | Robinson | 521/177 |

*Primary Examiner*—Maurice J. Welsh
*Attorney, Agent, or Firm*—Alvin T. Rockhill

[57] ABSTRACT

Polyurethane can be made having improved heat stability, sufficient to withstand paint oven temperatures by mixing or dispersing about 0.5 to 10 parts or more of an organic monosulfide or disulfides, preferably where the organo radical is a hydroxyl phenyl or hydroxyl alkyl substituted phenyl radical per 100 parts of the polyurethane reactants and reacting to form the polyurethane.

3 Claims, No Drawings

STABILIZING URETHANES WITH ANTIOXIDANTS

FIELD OF THE ART

This invention relates to a method of improving the heat stability of polyurethanes and to said heat stabilized polyurethane. More particularly this invention relates to the use of an organo monosulfide/disulfide substance to improve the high heat stability of the polyurethane at temperatures as low as 145° C. to 170° C. and as high as 200° C. and to said organic sulfide containing polyurethane.

PRIOR ART

Polyurethanes, especially the polyetherurethanes are well known to be susceptible to elevated temperatures and thus degrade at elevated temperatures to thereby lose their physical properties such as modulus, tensile, and related properties, and thereby limit their commercial utility. The usual amino and hydroxyl aryl antioxidants have been suggested to be used, but unfortunately the mechanism of degradation does not appear to be due to oxidation, but some other mechanism appears to be the cause of the degradation such as for instance as the mobile hydrogen on the urethane group. Consequently, the usual antioxidants such as the phenolics and the amine type are not successful in preventing the heat degradation such as that exhibited by polyurethanes are exposed in the typical paint ovens used in the automobile industry. That is temperatures of above 145° C. to as high as 200° C. This problem is experienced with the polyester urethanes, hydrocarbon urethanes and the polyetherurethanes when the curative is an amine, a polyol or water.

SUMMARY OF THE INVENTION

An aspect of this invention is directed to improving the heat stability of polyurethanes to permit them to pass through a paint oven without losing their effective physical properties. This is achieved by adding an organomonosulfide or polysulfide, preferably in liquid form to the polyurethane reactants, i.e. the polyol, or the organic polyisocyanate or their mixture such as their prepolymer and then reacting to give the polyurethane. Usually about 0.5 to 10 and preferably 1 to 5 parts of the organic monosulfide or polysulfide per 100 parts of the polyurethane viz reactants is sufficient to achieve at least some to major improvements in the heat stability. The organic monosulfides and polysulfides are a well known class of compounds and occur as either liquids or solids. These sulfides are readily prepared for instance by the reaction of the sulfur chlorides such as sulfur tetrachlorides with alcohols or phenols at elevated temperature to drive off hydrogen chloride. Another way is to react alkali sulfides with organic chlorides. The liquid sulfides prepared in these manners are particularly desirable as they are readily mixed homogeneously in the polyurethane reactants to give a reaction product having the sulfide mixed essentially uniformly therein.

The monosulfides obtained by reacting sulfur chloride with phenol and alkyl substituted phenols are particularly desired as they contain the diphenol monosulfide groups with the phenolic groups, i.e. the hydroxyl being able to function as an antioxidant alone with the monosulfide activity to achieve heat stabilization or enhanced stabilization. Specific examples of these sulfides is the di-(tertiary butyl methyl phenol)monosulfide sold under the trademark designation Santowhite-MK, as either a liquid or crystal. The Santowhite-MK TM is the liquid sulfide reaction product of the para isomer of the tertiary butyl methyl phenol with sulfur chloride and the crystalline product is the sulfide derivative of the ortho tertiary butyl methyl phenol. Both can be used to advantage in this invention either alone or in combination.

In simplified form these monosulfides can be represented as a di(hydroxy aromatic) sulfide or disulfides where the aromatic radical is a benzene ring substituted with a hydroxyl radical and at least one alkyl radical with preferably at least one of the alkyl radicals being a tertiary alkyl radical. Usually the alkyl radical has one, two, three and four and higher carbon atoms.

The nature of this invention and its advantages can be more readily understood by references to the following illustrative and exempliary examples where all parts are by weight unless otherwise indicated.

Polyurethanes were made by mixing the polyol stream at 44° C. with the isocyanate stream at 44° C. in a commercial polyurethane mixing apparatus using the recipes A and B below:

| Recipes, Parts | A | B |
| --- | --- | --- |
| Polypropylene ether glycol | 67 | 67 |
| Polypropylene ether triol | 29 | 29 |
| Tin catalyst | 0.001 | 0.001 |
| Mondur PF* | 129 | 129 |
| Ratio polyol/isocyanate Index | 1.29 | 1.29 |
| Santowhite-MK TM | — | 2.0 |

*Mondur TM PF is a commercial isocyanate of Mobay Chemical Company

The gel time for these reactants was about 15 seconds. The tensiles (psi) on the cured samples after 1 hour at room temperature and at the bake temperature indicated is given in the tabulation below.

| | RECIPE A | | RECIPE B | |
| --- | --- | --- | --- | --- |
| Bake Temperature | psi | Pascal × $10^4$ | psi | Pascal × $10^4$ |
| (Room Temperature) | 3380 | 2,366 | 3670 | 2,530 |
| 150° C. | 2800 | 1,930 | 3760 | 2,592 |
| 170° C. | 2080 | 1,434 | 3350 | 2,310 |
| 180° C. | 1230 | 848 | 3030 | 2,089 |
| 190° C. | 280 | 193 | 1200 | 827 |

It should be noted that the monosulfide greatly retarded the loss of tensile. A porous polyether urethane can be made by including a blowing agent in the recipe where the blowing agent is water, fluorocarbon and the porous urethanes have improved properties. These porous polyurethanes exhibit improved aging.

When the crystalline sulfides are used, care should be taken to get them uniformily mixed in the reactants before they react and cure. Thus greater care is required. Hence, longer mixing at higher temperatures when using the crystalline or solid sulfides may be needed to get the best results.

Instead of the liquid Santowhite-MK TM of Recipe B, other liquid mono or disulfides may be used, those having a boiling point of 100° to 500° C. are desirable and the liquid aromatic mono and disulfides are preferred. As indicated hereinbefore, the crystalline organic mono and disulfides are less likely to be loss during the paint oven exposure. For example, the crystalline sulfides, i.e. the reaction product of 4,4'-butylidine-bis(6-t-butyl-m-cresol) with a sulfur chloride or 4,4'-thiobis-(6-t-butyl-m-cresol) may be used in Recipe B, too.

While certain representative embodiments and details have been shown for the purpose of illustrating the invention, it will be apparent to those skilled in this art that various changes and modifications may be made therein without departing from the scope of the invention.

What is claimed is:

1. An improved heat stable polyurethane composed of the reaction product of polyurethane reactants containing about 0.5 to 10 parts of an organic monosulfide or disulfide per 100 parts of said polyurethane reactants, wherein the organic monosulfide or disulfide is that obtained by reaction of a sulfur chloride with 4,4'-thiobis(6-t-butyl-m-cresol) or 4,4'-butylidine-bis(6-t-butyl-m-cresol).

2. An improved heat stable polyurethane composed of the reaction product of polyurethane reactants containing about 0.5 to 10 parts of an organic monosulfide or disulfide per 100 parts of said polyurethane reactants, wherein the organic monosulfide or disulfide is that obtained by reaction of a sulfur chloride with 4,4'-thiobis(6-t-butyl-m-cresol) or 4,4'butylidine-bis(6-t-butyl-m-cresol) or is a di-(tertiary butyl methyl phenol)monosulfide.

3. The heat stable polyurethane of claim 2 wherein the organic monosulfide or disulfide is di-(tertiary butyl methyl phenol)monosulfide.

* * * * *